United States Patent
Seo et al.

(10) Patent No.: US 11,317,143 B2
(45) Date of Patent: Apr. 26, 2022

(54) DYNAMIC REDUCTION IN PLAYOUT OF REPLACEMENT CONTENT TO HELP ALIGN END OF REPLACEMENT CONTENT WITH END OF REPLACED CONTENT

(71) Applicant: Roku, Inc., San Jose, CA (US)

(72) Inventors: Chung Won Seo, Seoul (KR); Seunghyeong Lee, Goyang (KR)

(73) Assignee: Roku, Inc., San Jose, CA (US)

( * ) Notice: Subject to any disclaimer, the term of this patent is extended or adjusted under 35 U.S.C. 154(b) by 106 days.

(21) Appl. No.: 16/183,266

(22) Filed: Nov. 7, 2018

(65) Prior Publication Data
US 2020/0059692 A1 Feb. 20, 2020

Related U.S. Application Data

(60) Provisional application No. 62/765,276, filed on Aug. 17, 2018.

(51) Int. Cl.
*H04N 21/44* (2011.01)
*H04N 21/81* (2011.01)
*H04N 21/43* (2011.01)
*H04N 21/2187* (2011.01)

(52) U.S. Cl.
CPC . *H04N 21/44016* (2013.01); *H04N 21/43072* (2020.08); *H04N 21/812* (2013.01); *H04N 21/2187* (2013.01)

(58) Field of Classification Search
CPC ........... H04N 21/44016; H04N 21/812; H04N 21/43072; H04N 21/2187
See application file for complete search history.

(56) References Cited

U.S. PATENT DOCUMENTS 8,789,097 B2 7/2014 Chen
9,860,573 B2 1/2018 Kwon et al.
(Continued)

FOREIGN PATENT DOCUMENTS

CN 105847888 8/2016
CN 106170103 11/2016
(Continued)

OTHER PUBLICATIONS

International Search Report and Written Opinion from International Application No. PCT/US2019/036001, dated Sep. 27, 2019.

*Primary Examiner* — Nicholas T Corbo
(74) *Attorney, Agent, or Firm* — McDonnell Boehnen Hulbert & Berghoff LLP

(57) ABSTRACT

When a device is playing out a media stream, the device determines a target time at which the device is to start playing out replacement content in place of a portion of the media stream. However, the device then detects that a starting time when the device starts playout of the replacement content is delayed from the target time by a delay period of duration P. In response, the device then reduces its playout of the replacement content by duration P, to help playout of the replacement content end at a desired time. For instance, the device could seek forward in playout of the replacement content by duration P and/or could remove one or more other portions of the replacement content to total a reduction of duration P.

20 Claims, 9 Drawing Sheets

(56) References Cited

U.S. PATENT DOCUMENTS

| | | | |
|---|---|---|---|
| 2003/0001977 A1* | 1/2003 | Wang | H04N 21/23418 348/700 |
| 2003/0018966 A1 | 1/2003 | Cook et al. | |
| 2007/0033633 A1 | 2/2007 | Andrews et al. | |
| 2009/0167942 A1 | 7/2009 | Hoogenstraaten et al. | |
| 2010/0205049 A1* | 8/2010 | Long | G06Q 30/02 705/14.5 |
| 2010/0218208 A1* | 8/2010 | Holden | G11B 27/00 725/32 |
| 2011/0022471 A1 | 1/2011 | Brueck et al. | |
| 2014/0035938 A1* | 2/2014 | Wang | H04N 21/42653 345/520 |
| 2014/0115625 A1 | 4/2014 | McCoy et al. | |
| 2014/0186014 A1* | 7/2014 | Wordley | H04N 21/6587 386/345 |
| 2014/0259048 A1 | 9/2014 | Brueck et al. | |
| 2015/0312650 A1* | 10/2015 | Ramaswamy | H04N 21/845 725/32 |
| 2016/0226942 A1 | 8/2016 | Bhardwaj et al. | |
| 2016/0316261 A1 | 10/2016 | Koshevoy | |
| 2017/0026670 A1 | 1/2017 | Kummer et al. | |
| 2017/0251039 A1 | 8/2017 | Hoffert et al. | |
| 2017/0311009 A1 | 10/2017 | Li | |
| 2018/0061459 A1* | 3/2018 | Song | H04N 21/4828 |
| 2019/0069019 A1* | 2/2019 | Hsu | B66B 3/008 |

FOREIGN PATENT DOCUMENTS

| | | |
|---|---|---|
| CN | 107277554 | 10/2017 |
| CN | 107707969 | 2/2018 |
| JP | 2017041289 | 2/2017 |
| KR | 20180090062 | 8/2018 |

\* cited by examiner

DYNAMIC REDUCTION IN PLAYOUT OF REPLACEMENT CONTENT TO HELP ALIGN END OF REPLACEMENT CONTENT WITH END OF REPLACED CONTENT

REFERENCE TO RELATED APPLICATION

This application claims priority to U.S. Provisional Patent Application No. 62/765,276, filed Aug. 17, 2018, the entirety of which is hereby incorporated by reference.

This application is also related to another U.S. patent application filed by the same applicant on the same date as this application, entitled "Dynamic Playout of Transition Frames While Transitioning Between Playout of Media Streams," and having Ser. No. 16/183,185, the entirety of which is hereby incorporated by reference.

BACKGROUND

A typical media client operates to receive and play out (e.g., output for playout) an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, gaming consoles, streaming media players, and the like.

By way of example, the media client could be a television, which could receive a media stream (e.g., an over the air broadcast stream, a media stream output from a set top box, a media stream played from a digital storage medium, an Internet stream, or another such stream) and could present the media content of that stream to a user. As another example, the media client could be a set top box or digital video or audio recorder, which could receive a broadcast stream from a multi-channel video program distributor and/or from data storage and could output the media content of that stream via a High-Definition Multimedia Interface (HDMI) cable or other interface to a television and/or audio/video receiver for playout. And as yet another example the media client could be a loudspeaker or headphones, which could receive an audio stream from a radio, computer, or other receiver or audio storage device and could present the audio content of that stream to a user. Numerous other examples are possible as well.

SUMMARY

As a media client is playing out a media stream, it may be useful in certain situations for the media client to replace a portion of the stream's media content. For example, it may be useful for the client to dynamically replace an ad or other segment of the media content with a replacement ad or with other replacement content, so that as the content is being presented to a user, the user would receive the replacement ad in place of the originally included ad.

Further, it may be desirable for the client to perform such content replacement at a specific time point within the media stream. For instance, if the client is to dynamically replace an existing ad with a replacement ad, it may be desirable for the client to position the replacement ad at a time in the media stream when the existing ad would have started.

More particularly, the media stream at issue could define a sequence of frames, such as video frames and/or audio frames, and it may be desirable for the client to perform the content replacement starting at a particular frame of the media stream. For instance, for ad replacement, it may be desirable for the client to insert the replacement ad in place of the existing ad, starting at the first frame of the existing ad.

To facilitate such content replacement, the client could learn the specific time point in the media stream where the client should start the content replacement, and the client could learn what replacement content that the client should start playing at the indicated time point. At the desired content-switching time point, the client could then transition from playing out the existing media stream to playing out the replacement content as a replacement media stream. Further, when the client finishes playing out the replacement media stream, the client could then transition back to playout of the original media stream (e.g., in progress).

One technical difficulty with this process is that it may take some time for the client to transition from playing out a first stream to playing out a second stream, e.g., to start a content replacement, or to switch back to the original stream at the end of a content replacement. This could be the case as the client may need to engage in several processing- and memory-intensive steps before it can start to play out the second stream. For instance, the client may need to clear caches, receive and decode at least an initial portion of content of the second stream, and populate a memory buffer with the decoded content for rendering.

In practice, this stream-transition process could take well more than one frame's worth of time. For instance, if the media at issue is video at a frame rate of 30 frames per second, each frame would span $\frac{1}{30}$ of a second, i.e., about 33.3 milliseconds (ms). Yet the act of transitioning from one video stream to another may take on the order of hundreds of milliseconds, thus spanning numerous video frames' worth of time.

Although the client could work to account for this timing by starting its stream-transition process sufficiently far in advance of the desired content-switching time point, the actual amount of time that the transition process will take may be unpredictable for various reasons. Therefore, it may be unclear precisely how early the client should start the transition process.

Unfortunately, if the client starts the transition process too late, then the client might not finish the process by the desired content-switching time point, which could give rise to user-experience issues, as the playout of the second stream may start too late and consequently may end too late.

For instance, in an ad-replacement scenario where the client is to substitute a replacement ad for an original ad of the same duration in a linear broadcast feed, if the client starts playing out the replacement ad too late, then the client may end up playing out some of the original ad and then abruptly switching to playout of the replacement ad. Further, if the client plays out the replacement ad for its full duration, then the replacement ad may continue beyond the end of the original ad, possibly cutting off some content of the underlying broadcast feed after the original ad.

To help address this issue, per the present disclosure, the client could detect that the time point when the client will start playing the replacement content is too late, and the client could determine how long the delay is from the desired start point. The client could then strategically reduce its playout of the replacement content in a manner that will cause playout of the replacement content to end on time.

For instance, the client could automatically seek forward in the replacement content by the determined delay duration and start playout of the replacement content there. Alternatively, the client could automatically truncate the end of the replacement content to remove the determined delay duration from the end, or the client could selectively remove one or more frames (e.g., duplicate frames and/or inter-frames if applicable) from within the replacement content. Further, the client could carry out a combination of these and/or other such operations. For instance, the client could remove some portions of the replacement content from the beginning, middle, and end, to total a reduction by the determined delay duration.

Further, to help cope with playout of the replacement content starting after the start of the underlying content that is to be replaced, the client could also strategically play out some transition frames in place of that underlying content, until the client is ready to start playing out the replacement content.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
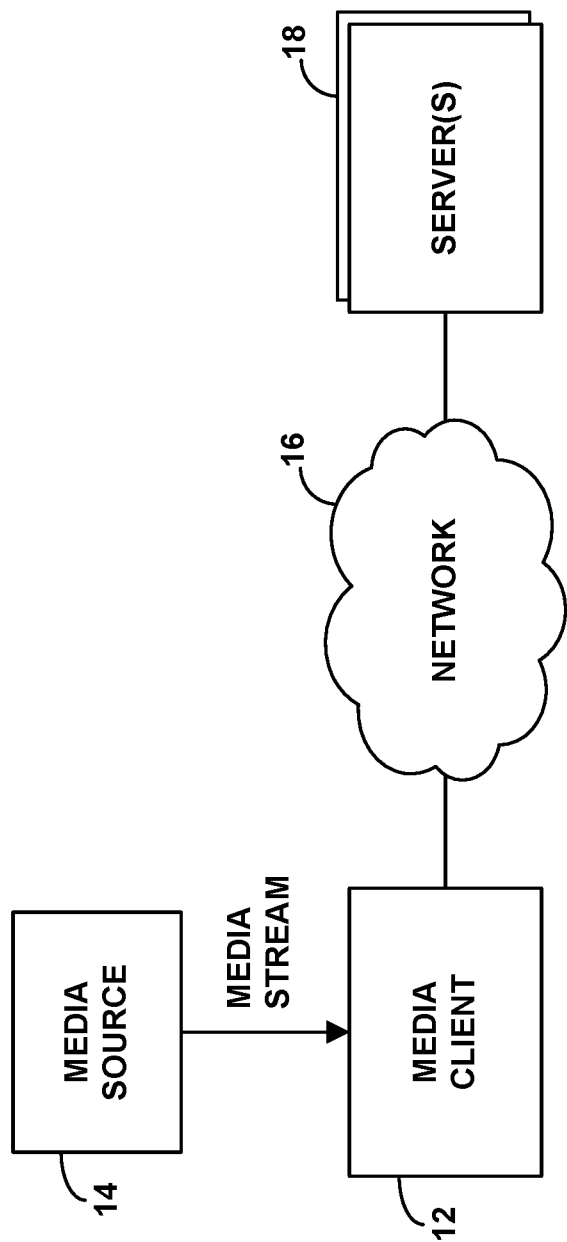
FIG. 1 is a simplified block diagram of system in which disclosed features can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that operations described herein as being carried out by one or more entities could be implemented by and/or on behalf of those entities, through hardware, firmware, and/or software, such as by one or more processing units executing program instructions or the like.

As shown in FIG. 1, the example system includes a media client 12 configured to receive a media stream in real-time from a media source 14.

The media client 12 could be configured to operate as described above to receive from the media source 14 an analog or digital media stream representing media content such as video and/or audio content and to output the media content and/or forward the stream for presentation of the content on a user interface such as a display screen and/or an audio speaker. The media client could take any of the forms described above, among other possibilities.

The media source 14 could also take various forms, possibly depending on the form of the media client 12. By way of example, if the media client 12 is a television, the media source 14 could be a local set top box (e.g., cable or satellite receiver) or a streaming media server, configured to output a selected media stream for presentation by the television, or the media source 14 could be a broadcast television station or the like, among other possibilities. And if the media client is a computer, the media source may comprise an Internet streaming media server or other media provider. Alternatively, the media source 14 could be data storage integrated with and/or accessible locally by the media client 12, with the media client receiving (e.g., retrieving) the media stream from the data storage for playout, such as when the client is playing out the media stream or is forwarding the media stream for playout. Other examples are possible as well.

As further shown in FIG. 1, media client 12 could have a communication interface with a network (e.g., the Internet or a private network) 16 through which the media client can engage in communication with one or more servers 18. Servers 18 could include file servers, media servers, and/or other types of content servers or the like. Further, although media source 14 is shown separately from servers 18, media source 14 could alternatively be included or integrated with one or more of servers 18 and could be accessible via network 16.

As noted above, when a media client such as client 12 is receiving and playing out (e.g., outputting for playout) a media stream, it may be useful for the client to replace a portion of the stream with replacement content defining a replacement stream. Further, as noted above, it may be desirable for the client to do this at a specific time point within the media stream. For instance, if the stream defines a sequence of frames, such as video frames and/or audio frames, it may be desirable for the client to perform the content replacement starting at a specific frame of the sequence.

In practice, the client could learn (determine) in various ways the specific target time point in the media stream where the client should start the content replacement.

For instance, the client could be provisioned with, or receive along or in association with the media stream, a set of data that identifies or timestamps each frame within the media stream (e.g., timestamps embedded in the media stream or otherwise provided through in-stream signaling) as well as data that specifies the identity or timestamp of the frame where the content replacement is to start. Based on that data, the client could thus determine the specific time point in the media stream where the content replacement is to start.

Alternatively, as the client receives and plays out the media stream, the client could work with a network server to learn the point in the media stream where the content replacement is to start, as a desired content-switching time point. For instance, the server could first identify the media stream being played out by the client. And upon identifying the media stream, the server could then determine a specific time point in the media stream where the client should start the content replacement and could inform the client of that determined time point.

To facilitate the server's identification of the media stream being played out by the client, the client (or perhaps an adjunct device) could generate digital fingerprint data representing the media content in real time as the client receives the stream, and the server could compare that fingerprint data with reference fingerprint data representing media content of a known media stream, with a fingerprint match indicating that the media stream being played by the client is the known media stream.

The server could establish or otherwise have access to reference fingerprint data representing the known media stream. For instance, the server or an associated watching station or other entity could receive a broadcast of the known media stream and, while receiving the broadcast, could generate a sequence of reference digital fingerprints representing frames of the known media stream. The server or another entity could establish these reference fingerprints by programmatically analyzing frames of the known media stream, receiving as input a copy of the known media stream and applying any media fingerprinting process or algorithm now known or later developed to generate the reference fingerprints. Or the server could otherwise establish or be provisioned with this sequence of reference fingerprints representing the known media stream. The server could then store the reference fingerprints in association with an identity of the known media stream.

Further, in real time as the client plays out the media stream, the client could generate query fingerprints representing frames of that stream and could transmit the query fingerprints to the server for analysis. To facilitate fingerprint comparisons, the client could generate these query fingerprints using the same fingerprinting process or algorithm that is or was applied to establish the reference fingerprints. In addition, the client could generate the query fingerprints at a particular frame rate and could transmit the fingerprints in groups to the server. For instance, for a media stream comprising video at 30 frames per second, the client might generate the query fingerprints at a reduced frame rate on the order of 2 frames per second to help conserve resources, and the client might transmit a latest group of query fingerprints to the server every 1.5 seconds or so. Other examples are possible as well.

As the server receives the query fingerprint data from the client, the server could compare the query fingerprint data with the reference fingerprint data of the known media stream. And if the server thereby determines with sufficient confidence that the query fingerprint data matches the reference fingerprint data, the server could conclude that the media stream being played out by the client is the known media stream.

The server could conduct this fingerprint comparison on a per-frame basis. Considering video content, for instance, the server could conduct the analysis on a per-video-frame basis, comparing a query fingerprint of a frame against a reference fingerprint of a frame. The comparison process could take any of a variety of forms, depending on the structure of the fingerprints. For example, the comparison could involve computing a maximum deviation between the fingerprints and determining if the maximum deviation is within a predefined tolerance. Further, if the fingerprints are binary, this could be a Boolean determination or could involve computing a Hamming distance (as a count of mismatches between respective bit locations in the fingerprints). And if the fingerprints are more complex values, such as decimal values or vectors (e.g., grey values per video frame region), this could involve determining a distance between the values or vectors. Numerous other examples are possible as well.

In addition, the server could conduct this fingerprint comparison process with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media.

Through this comparison of the client-generated query fingerprints with the reference fingerprints of the known media stream, the server could thereby find one or more matches. For instance, the server could find one or more instances where a query fingerprint of a frame of the media stream being played out by the client matches a respective reference fingerprint of a frame of the known media stream. This matching could thus establish or support a conclusion that the media stream being played out by the client is the known media stream.

Alternatively, the server could identify the media stream at issue in other ways. For instance, if the media stream contains watermark data corresponding with an identity of the media stream, the client could read or otherwise extract the watermark data and report the watermark data to the server. And the server could then use the reported watermark data as a basis to identify the media stream being received by the client. For example, the server could consult reference data that correlates various watermark data with particular known media streams, to determine that the watermark data reported by the client corresponds with a particular known media stream.

Having identified the media stream being played out by the client, the server could then determine a time point in the media stream where a content replacement is to occur. For instance, the server could consult reference data that specifies a time point within the known media stream where a content replacement is to start. And the server could then transmit to the client a directive that indicates that time point.

The replacement time point specified by the server's reference data could be defined in a manner that is understandable to the client. For instance, if the client is provisioned with data that timestamps each frame of the media stream along a "true time" timeline defined within the media stream, the replacement time point that the server has might be the true-time timestamp of an upcoming frame of the media stream. The server could thus provide the client with that true-time timestamp as an indication of the time when the client should start the content replacement.

Further, the client could map that true-time timestamp to "client time" defined according to the client's internal clock so that the client can determine a time on its own clock when it should start the content replacement. For instance, the client could (i) compute a difference between the true-time timestamp of a current frame and the current time on the client's clock and (ii) apply that determined difference to the indicated true-time timestamp of the upcoming frame where the replacement is to occur, to determine the client-time point when the client should start the content replacement.

Alternatively, the replacement time point specified by the server's reference data might be defined in a manner that is not understandable to the client. For instance, the replacement time point that the server has might be a timestamp defined according to a true-time timeline within the known media stream, but the client might have no context or perspective for true time. In that case, the server could engage in a process to establishing a mapping or "synchronous lock" between true time and client time, and the server then map the true-time time point where the content replacement is to occur to a corresponding client-time time point and provide that client-time time point to the client.

As an non-limiting example of this, consider a media stream that defines an ad pod that could appear within a television broadcast. An ad pod comprises a sequence of ads, such as television commercials. With this example, the client might be a television that is receiving and playing out a linear broadcast feed of a particular television channel, and the ad pod might appear at any moment within that feed. Especially with a live broadcast such as a sporting event, for instance, the time when the ad pod appears in such a feed may be unpredictable. Alternatively, the ad pod could appear at a specifically scheduled time.

In this example, the desired content replacement could be replacement of a particular ad within the ad pod (e.g. substituting for the ad a different ad or other replacement content). For instance, if the ad pod is a sequence of ads A1, A2, A3, A4, the desired content replacement could be replacement of ad A3.

In this situation, the ad pod may define a true-time timeline starting at time T=0 and continuing to the end of the ad pod, and ad A3 may begin at time $T_{A3}$ on that timeline. However, the client may lack context for that timeline. The client may have its own internal clock that has a timeline (e.g., time of day or other internal time reference) defining client time. But without advanced knowledge of where the ad-pod timeline exists within client time, merely given the value $T_{A3}$ as the desired content-revision time point would not enable the client to start the ad replacement when desired.

For the server to establish synchronous lock between true time and client time in that context, the client could timestamp the query fingerprints that the client sends to the server. In particular, as the client plays out the media stream and generates query fingerprints, the client could timestamp each query fingerprint with a current client-time value. When the server detects one or more matches between the query fingerprints and timestamped reference fingerprints of the known media stream, the server could then use those matching points as a basis to map true time to client time. For instance, based on at least one such detected matching point, the server could define a mapping between (i) the true-time timestamp of the matching reference fingerprint and (ii) the client-time time stamp of the matching query fingerprint.

Once the server has established synchronous lock, the server could then use the established synchronous lock to translate the true-time time point where the content replacement is to occur into a corresponding client-time time point at which the content replacement is to occur. And the server could transmit that determined client-time time point to the client, to enable the client to start the content replacement at the desired time point in the media stream that the client is playing out.

Further, in an alternative implementation, the client rather than the server could carry out the process of establishing and applying synchronous lock in order to determine the client time point where the content replacement is to occur.

For instance, once the server has identified the media stream being received by the client, the server could transmit to the client some reference data defining reference fingerprints and true-time timestamps for an upcoming portion of the known media stream. The client could then conduct the fingerprint matching between query fingerprints and reference fingerprints to find one or more matching points, and the client could establish synchronous lock between true time and client time by similarly correlating the timestamps of at least one matching point. Once the client has established the synchronous lock, the client could then use the synchronous lock as a basis to translate a provided true-time time point where the content replacement is to occur into a corresponding client-time time point where the content replacement is to occur.

In addition to determining the target time point in the media stream when the client should start the content replacement, the client could also learn in various ways what content replacement the client should perform starting at that time point.

By way of example, the client could be pre-provisioned in advance with a specification of the content replacement to start at the indicated time point, such as an indication that the client should substitute certain content in place of existing content of the media stream. Alternatively, the client could receive from a server or another entity a specification of the content replacement to perform. For instance, when a server transmits to the client a directive informing the client of the time point in the media stream when the client is to start the content revision, the server could include in that directive (or provide separately) to the client a specification of the content replacement to perform.

In practice, the specification of the content replacement to perform could comprise a pointer to replacement content that the client is to obtain and is to insert in place of or as a supplement to existing content of the media stream. For example, as noted above, the specification could comprise a Universal Resource Locator (URL) that defines or correlates with a network address of a streaming media server, file server, or the like, from which the client could request and receive the replacement content. Alternatively, the specification could indicate in another way where and/or how the client is to obtain the replacement content, to facilitate performing the content replacement starting at the indicated time point in the media stream. Further, the specification could indicate a duration of the replacement content, to inform the client how long the client should play the replacement content in place of the original content.

At the indicated time point where the content replacement is to start, the client could thus switch from playing out the existing media stream to playing out the replacement content as a replacement media stream. Further, at the end of the content replacement, the client could then switch back to playing out the original media stream (e.g., in progress).

As a non-limiting example, consider again the ad pod discussed above. In practice, a server could be provisioned with timestamped reference fingerprints representing and corresponding with the frames of the ad pod. Further, the server could be provisioned with an indication that a particular one of the ads in the ad pod should be replaced, and with information to facilitate that ad replacement. For instance, the server could be provisioned with an indication of the true-time point of the first frame of the existing ad, a URL of a replacement ad, and an indication of the duration of the replacement.

On an ongoing basis as the client receives and plays out a linear broadcast feed that may contain this ad pod, or in response to one or more other triggers, the client could be generating timestamped query fingerprints of the broadcast feed and could be reporting those timestamped query fingerprints to the server for analysis. Comparing such query fingerprints with the reference fingerprints representing the frames of the ad pod sequence, the server could thereby detect that the client is playing out the ad pod sequence.

Having determined that the client is playing out the ad pod sequence, the server could then translate the true-time point of the frame where the ad replacement is to start into a corresponding client-time point in the manner discussed above for instance and could transmit to the client a directive that specifies that client-time point, includes a pointer to a replacement ad that the client is to substitute for frames of the media stream starting at that client-time, and directs the client to perform the indicated content replacement. Accordingly, the client could obtain the indicated replacement ad and could substitute that ad for frames of the media stream starting at the indicated client-time point.

Further, the server could inform the client of a duration of the ad replacement or of a client-time point when the ad replacement is to end, or that duration could be a standard or pre-set duration. And at the end of the ad replacement, the client could then switch back from playing out the replacement ad to playing out the broadcast feed (e.g., a remainder of the ad-pod sequence) in progress.

As explained above, a technical problem that can arise in this process is that it may take some time for the client to transition from playing out one stream to playing out another stream, such as from playing out an ad-pod sequence in a linear broadcast stream to playing out a replacement ad stream. In particular, as noted above, the client may need to engage in various processes, such as clearing caches, receiving and decoding content, and populating memory buffers, to facilitate starting to play out the replacement stream.

The starting point of this stream-transition process could be defined in various ways. For instance, if the client will receive content of the second stream from a streaming media server, the start of the stream-transition process could be when the client sends an initial Transport Control Protocol (TCP) handshake message to initiate setup of a TCP session with the server or when the client sends a Real-Time Streaming Protocol (RTSP) SETUP request or the like to initiate setup of a real-time transport protocol (RTP) session with the server, among other possibilities. Alternatively, if the client would receive content of the second stream in another manner or from another source, the starting point of the process could be defined in other ways. The end of the process could then be defined as the point in time when the client has buffered enough of the second media stream to start playing the stream while accounting for jitter and/or other issues. Other examples are possible as well.

As noted above, the stream-transition process, from start to finish, may take on the order of hundreds of milliseconds. Further, as resource constraints and other factors change from time to time, the actual amount of time that it will take the client to transition from one stream to another in any given instance may be unpredictable.

Experience may establish minimum and maximum expected stream-transition durations for the client (or for a representative client). For instance, testing might show that it will take anywhere from 300 ms to 500 ms for the client to transition from playout of a first stream to playout of a second stream (e.g., to the point where the client is ready to start playing the second stream). Thus, the client may have a minimum expected switching duration of 300 ms and a maximum expected transition duration of 500 ms, defining a 200 ms uncertainty range, among other possibilities.

The client could determine these minimum and maximum expected stream-transition durations by tracking stream-transition durations over time and rolling up the tracked durations to establish statistical measures of minimum and maximum, and/or the client could otherwise be provisioned with representative values of the expected transition durations.

Given this uncertainty range, the client could configure its switching process to start in advance of the desired content-switching time point by an amount of time equal to the maximum expected switching duration. That way, the client should theoretically end up starting to play out the second stream sometime within the uncertainty range, at or before the desired content-switching start time.

Unfortunately, however, once the client has finished its preparations for playing out the second stream, the client may then no longer be in a position to play out the first stream, since the client may now be buffering the second-stream content for playout rather than buffering the first-stream content for playout. Therefore, if the client finishes its preparations for playout out the second stream before the end of the maximum expected switching duration has passed, then the client may start playout of the second stream earlier than desired, which may result in user-experience issues. Further, for content-replacement such as ad replacement, this premature starting of the playout of the of the second stream might create associated user-experience issues at the end of the replacement duration when the client is to switch back from playout of the second stream to playout of the first stream.

One way to help avoid having the client start playing out the second stream earlier than desired is for the client to instead configure its switching process to start in advance of the desired content-switching time point by an amount of time that is less than the maximum expected switching duration. For instance, the client could start its switching process in advance of the desired content-switching time point by an amount of time that is less than the maximum expected switching duration but greater than or equal to the minimum expected switching duration.

By way of example, the client could start its switching process in advance of the desired content-switching time point by an amount of time that is an average expected switching duration, such as half way between the minimum expected switching duration and the maximum expected switching duration. Using the example values above, where the minimum expected switching duration is 300 ms and the maximum expected switching duration is 500 ms, for instance, the client could thus start its switching process 400 ms before the desired content-switching time point.

Yet this solution is also not optimal, since it may ultimately take the client longer than that average expected switching duration to prepare for playout of the replacement content. Consequently, the client might not finish its content-switching preparations until after the desired content-switching time point has passed. And as a result, as noted above, the client may end up playing some of the underlying content that is supposed to be replaced and then abruptly switching to playout of the replacement content, which may provide a poor user experience. Further, as noted above, if the client starts playing out the replacement content too late and plays the replacement content for its full duration, then playout of the replacement content may last beyond the end of the content that was supposed to be replaced and may cut off the start of succeeding content of the underlying media stream.

The present disclosure provides a mechanism to help address the technical problem of playout of replacement content starting too late and therefore ending too late.

Per the disclosure, when the client has started or will start playing out replacement content with some delay after a desired content-switching time point has passed, the client will determine how long the delay is. For example, the client could determine how long has passed or will have passed from the desired content-switching time point to the time when playout of the replacement content started or will start. And as noted above, the client will then strategically reduce its playout of the replacement content in a manner that will cause its playout of the replacement content to end on time. Further, to help cope with playout of the replacement content starting after the start of the underlying content that is to be replaced, as noted above, the client could also strategically play out some transition frames in place of that underlying content, until the client is ready to start playing out the replacement content.

This process assumes that the content to be replaced (the original content) and the replacement content are the same duration D as each other, and that—absent any delay—the goal would be to start playout of the replacement content precisely in time when the original content would have started and to end playout of the replacement content precisely in time when the original content would have ended. For instance, in an ad-replacement scenario, an original ad and a replacement ad may each be 30 seconds or another typical ad duration, and the goal may be to start playout of the replacement ad precisely when playout of the original ad would have started and to end playout of the replacement ad precisely when playout of the original ad would have ended.

Further, the process assumes that the client's start to playout of the replacement content is, was, or will be delayed by a delay period of duration P seconds (perhaps several frames spanning just tens of milliseconds, possibly less than a second) after the time when the original content would have started, i.e., after the desired content-switching time point. The client could detect the existence of such a delay by detecting that the client has not started, or will not start, playout of the replacement content by the desired content-switching time point. And the client could compute the length of the delay by programmatically running a stopwatch from the when the desired content-switching time point arrives until the time when the client starts playing out the replacement content.

As the desire is for the client to then finish its playout of the replacement content precisely when the original content would have ended, the client will then be left with a reduced period of D-P (i.e., the difference between the full ad duration D and the delay period P) in which to play out the replacement content.

Given that the replacement content is of duration D, the client could facilitate playout of the replacement content in reduced period of D-P by removing P seconds from the replacement content, i.e., by forgoing playout of P seconds of the replacement content. In accordance with the present disclosure, the client could do this by removing P seconds of the start of the replacement content, removing P seconds of the end of the replacement content, or removing one or more portions of the replacement content totaling P seconds.

As one example of this process, upon determining that playout of the replacement content is delayed by P seconds, the client could responsively seek forward within the replacement content (i.e., jump ahead in the replacement content stream) by P seconds and start playout of the replacement content at the P-second time point. That way, the client's playout of the remainder of the replacement content should take just D-P seconds, so that the playout will end on time. With this example, since the client will be starting playout of the replacement content at a point that is later than the actual start of the replacement content, the client could also add a fade-in (e.g., dissolve) to playout of the replacement content so that the starting of playout of the replacement content does not seem so abrupt.

The client could carry out this seeking operation starting precisely at the beginning of the replacement content. Alternatively, the client might start its seeking-forward at a point after (perhaps slightly after) the beginning of the replacement content and could still jump ahead by P seconds in playout of the replacement content.

As another example of this process, upon determining that playout of the replacement content is delayed by P seconds, the client could responsively end playout of the replacement content P seconds early. That is, the client could start playout of the replacement content at the start of the replacement content but, rather than playing the replacement content for the fully duration of D seconds, could stop playout of the replacement content (and switch back to the underlying media stream) once the client has played out D-P seconds of the replacement content. As playout of the replacement content will thus take just D-P seconds, the playout should likewise end on time. Further, with this example, since the client will be ending playout of the replacement content early, the client could also add a fade-out from the replacement content back to the underlying media stream so that the ending of playout of the replacement content will not seem so abrupt.

As yet another example of this process, upon determining that playout of the replacement content is delayed by P seconds, the client could responsively engage in a process to selectively remove frames from within the replacement content, in an effort to reduce the total duration of playout of the replacement content to D-P seconds.

For instance, as the client plays out the replacement content, the client could examine upcoming frames of the replacement content that it has buffered for playout, in search of frames that the client could reasonably remove and thus not play out.

By way of example, if the media at issue comprises video, the client could search for instances where the images of two or more consecutive frames are identical or sufficiently similar, optimally when there is no accompanying audio. The client could conduct this analysis by generating and comparing fingerprints of consecutive frames, by pattern matching, and/or in some other manner. Each time the client finds such repeat frames, the client could then discard one or more duplicate frames. Alternatively or additionally, the client could look for inter-frames (e.g., P-frames or B-frames) of video, also optimally when there is no accompanying audio, and could similarly remove those frames. Further, if the media at issue comprises audio, the client could search for silent frames, possibly repeated silent frames, and could likewise discard those frames.

Alternatively, the client could apply one or more other processes to selectively remove frames from the replacement content, to help reduce the duration of replacement content by the delay period P.

By selectively carrying out this frame-removal process at possibly multiple different times within the replacement content, the client might be able to more subtly remove a total of P seconds of frames, so that the resulting duration of playout of the replacement content would be just D-P seconds and would therefore end on time. Alternatively, if the client has not been able to remove a sufficient number of frames of the replacement content when the client approaches D-P seconds of playout of the replacement content, then the client could end playout of the replacement content early enough to bring the total duration of playout of the replacement content down to D-P seconds, so that it will likewise end on time.

As further noted above, when the client is going to start playing out the replacement content with a delay of P seconds, the client could also play out some transition frames in place of the original content during that delay period. To facilitate this, when the client detects that the desired content-switching time point has arrived, the client could determine that it is not yet ready to start playing the replacement content. In response, the client could then start generating and playing out transition frames in place of the original content until the client is ready to start playing out the replacement content. And when the client is ready to start playing out the replacement content, the client could then switch from playing out the transition frames to playing out the replacement content. Further, the client could add fading (e.g., dissolving) from playout of the transition frames to playout of the replacement content, to help smooth that transition.

In practice, the transition frames could take various forms, based on the type of media at issue. For instance, if the media comprises video (possibly along with audio), then the transition frames could comprise black frames and/or copies of a frame immediately preceding the transition. By way of example, the client could play out black frames for the duration of transition period (until transitioned to play out the replacement content). Alternatively, for some time into the transition period, the client could play out frames that are a copy of a latest frame of the first stream and could then fade from that image to black frames for a remainder of the transition period. Whereas if the media comprises audio (possibly along with video), then the transition frames could be silent frames. In particular, the client could present silent frames for the duration of the transition period. Other examples are possible as well.

FIGS. 2-6 illustrate examples of some of the processes discussed above, particularly in an ad-replacement scenario. Each of these figures depicts content playout along a timeline, with time progressing from left to right.

Figure 2:
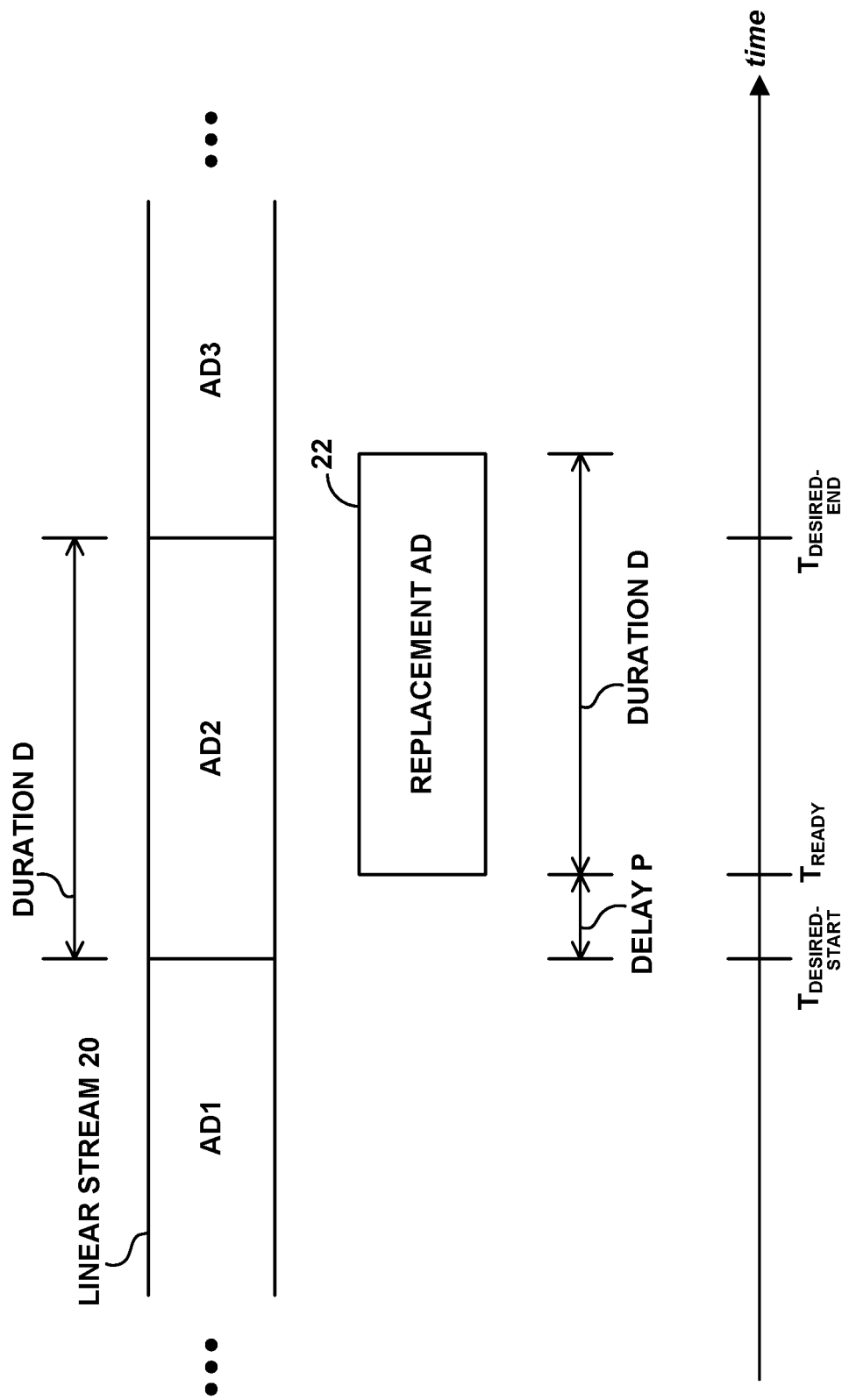
FIG. 2 is a diagram illustrating an ad-replacement scenario where playout of a replacement ad starts late.

FIG. 2 depicts the problem scenario where a client is playing out an ad pod within a linear stream 20 and where the client is to substitute playout of a replacement ad 22 for an ad, AD2, of the linear stream, but where playout of the replacement ad 22 starts late. As shown, AD2 is of duration D, and the replacement ad 22 is also of duration D. Further, as shown along the timeline, the ultimate goal would have been to start playout of the replacement ad precisely at the start of AD2, at time $T_{DESIRED-START}$, and to end playout of the replacement ad precisely at the end of AD2, at time $T_{DESIRED-END}$. Yet as shown, the client delays starting its playout of the replacement ad by P seconds, as the client is ready to start playout of the replacement content at time $T_{READY}$, which is P seconds after time $T_{DESIRED-START}$. As a result, in this scenario, the client may play out P seconds of AD2 and then abruptly switch to playing out the replacement ad. Further, the client's playout of the replacement ad may extend P seconds past the start of the next ad, AD3, thus possibly cutting off the start of that next ad.

Figure 3:
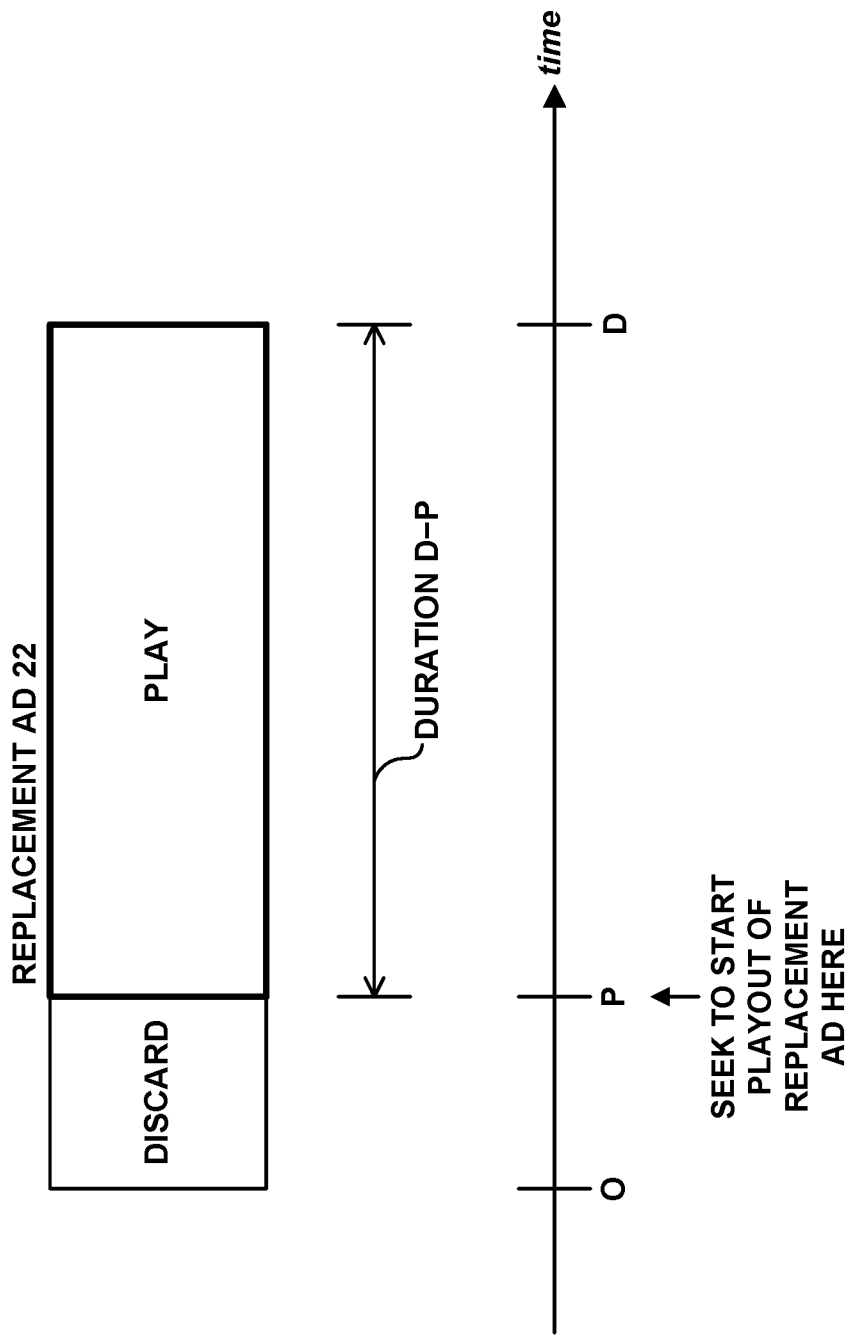
FIG. 3 is a diagram illustrating seeking ahead in the replacement ad of FIG. 2 to reduce playout time by the delay duration.

FIG. 3 depicts one mechanism for the client to help overcome these technical issues. In particular, FIG. 3 illustrates that the client could seek ahead in the replacement ad 22 by P seconds and start playout of the replacement ad at that point. To facilitate this in practice, the client could apply a native seek function to jump ahead in the replacement ad stream or could otherwise discard the first P seconds of frames of the replacement ad. As a result, the client would start its playout of the replacement ad at P seconds into the replacement ad, so that the client would play out just the last D-P seconds of the replacement ad.

Figure 4:
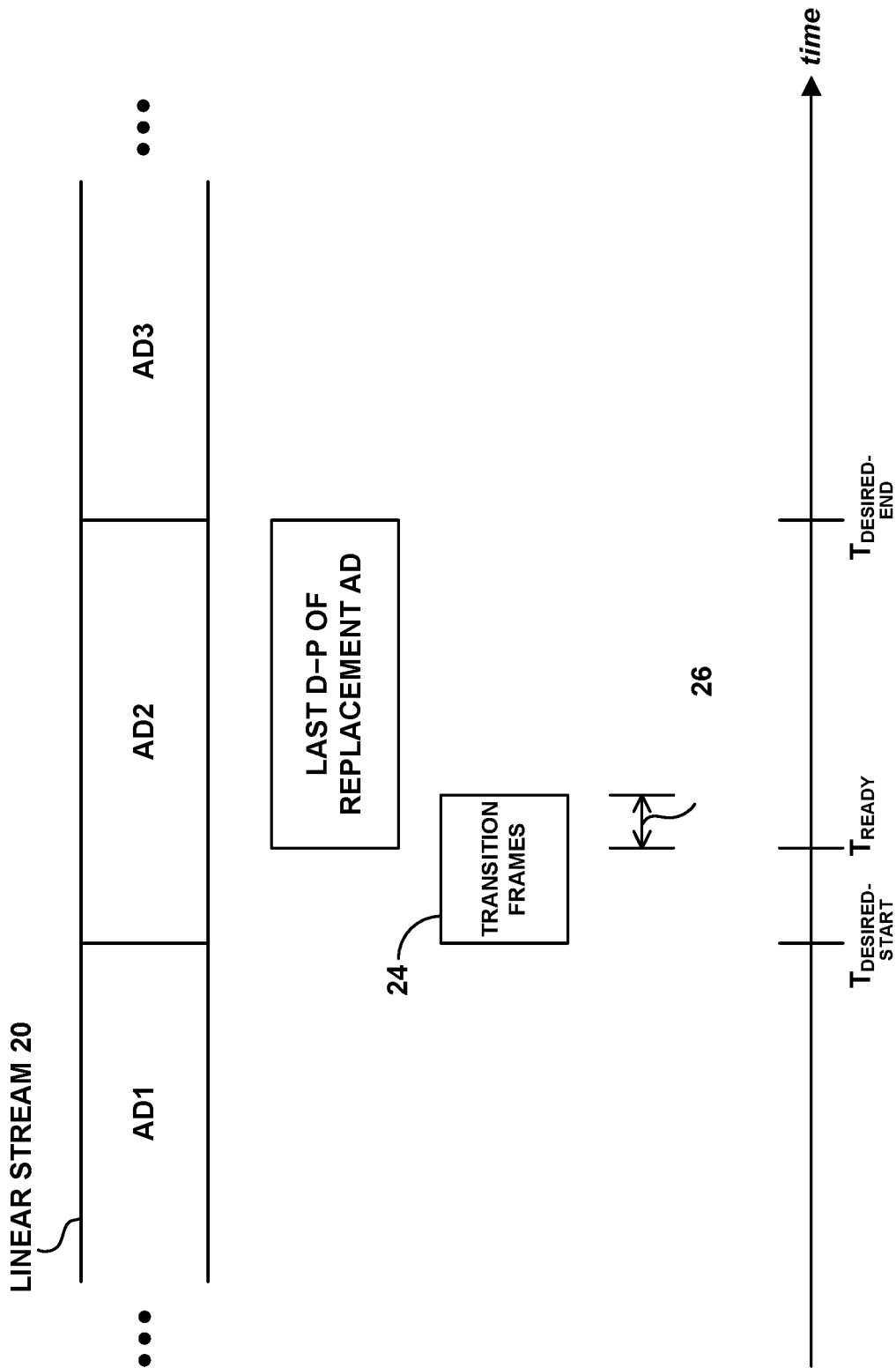
FIG. 4 is a diagram illustrating a result of the mechanism illustrated in FIG. 3.

FIG. 4 next illustrates an example result of this seeking process. As shown in FIG. 4, the client's playout of the last D-P seconds of the replacement ad will start at time $T_{READY}$ and will end at time $T_{DESIRED-END}$, so that the end of the client's playout of the replacement ad should optimally align with the end of AD2 in the underlying linear stream 20 as desired. (Though not shown, the client may also need to take action at or near the end of this replacement ad playout, to account for delay in switching back from playout of the replacement ad stream 22 to playout of the underlying linear stream 20. For instance, the client could handle that situation by playing out transition frames and perhaps by seeking forward in playout of AD3 by an appropriate duration.)

As further shown in FIG. 4, in line with the discussion above, the client could also add transition frames 24 with fade periods to help account for the delayed start of playing out the replacement ad. In an example implementation, the client could generate and play out these transition frames for at least the delay period (from $T_{DESIRED-START}$ to $T_{READY}$), to avoid playing out the start of AD2 that is supposed to be replaced by the replacement ad. Further, the client could extend playout of the transition frames for a fade period 26 after the delay period and, through the fade period 26, fade from playout of the transition frames to playout of the replacement ad, to help smooth that transition.

Figure 5:
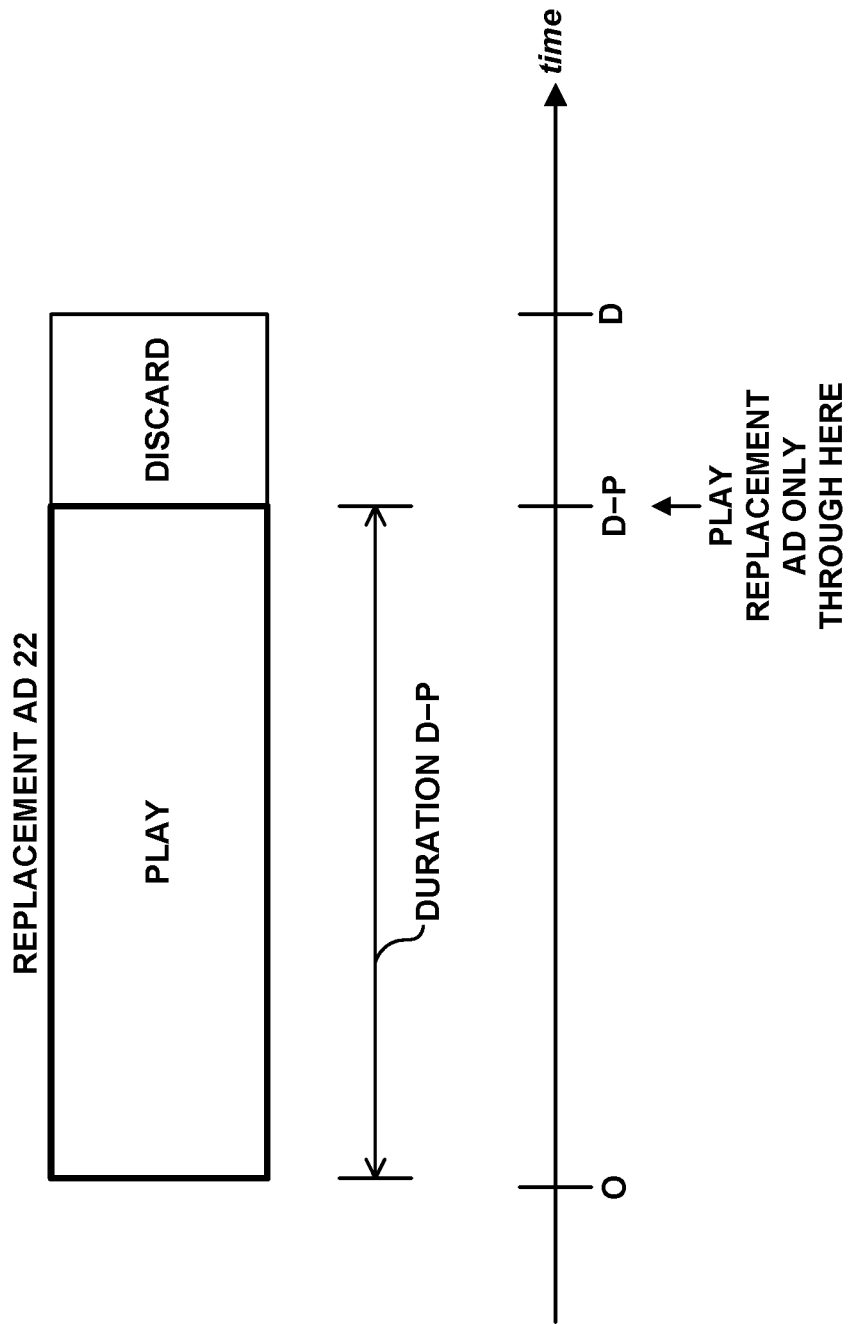
FIG. 5 is a diagram illustrating ending playout of the replacement ad early by the delay duration.

FIG. 5 illustrates an alternative mechanism for the client to help overcome the issues associated with delayed start to playout of the replacement ad. In particular, FIG. 5 illustrates that the client could end playout of the replacement ad P seconds early to avoid having playout of the replacement ad extend beyond time $T_{DESIRED-END}$. To facilitate this in practice, the client could play out just the first D-P seconds of the replacement ad, and the client could discard the last P seconds of the replacement ad. For instance, once the client starts playing out the replacement ad with the delay of P seconds, the client could then continue to play out the replacement ad for D-P seconds.

Figure 6:
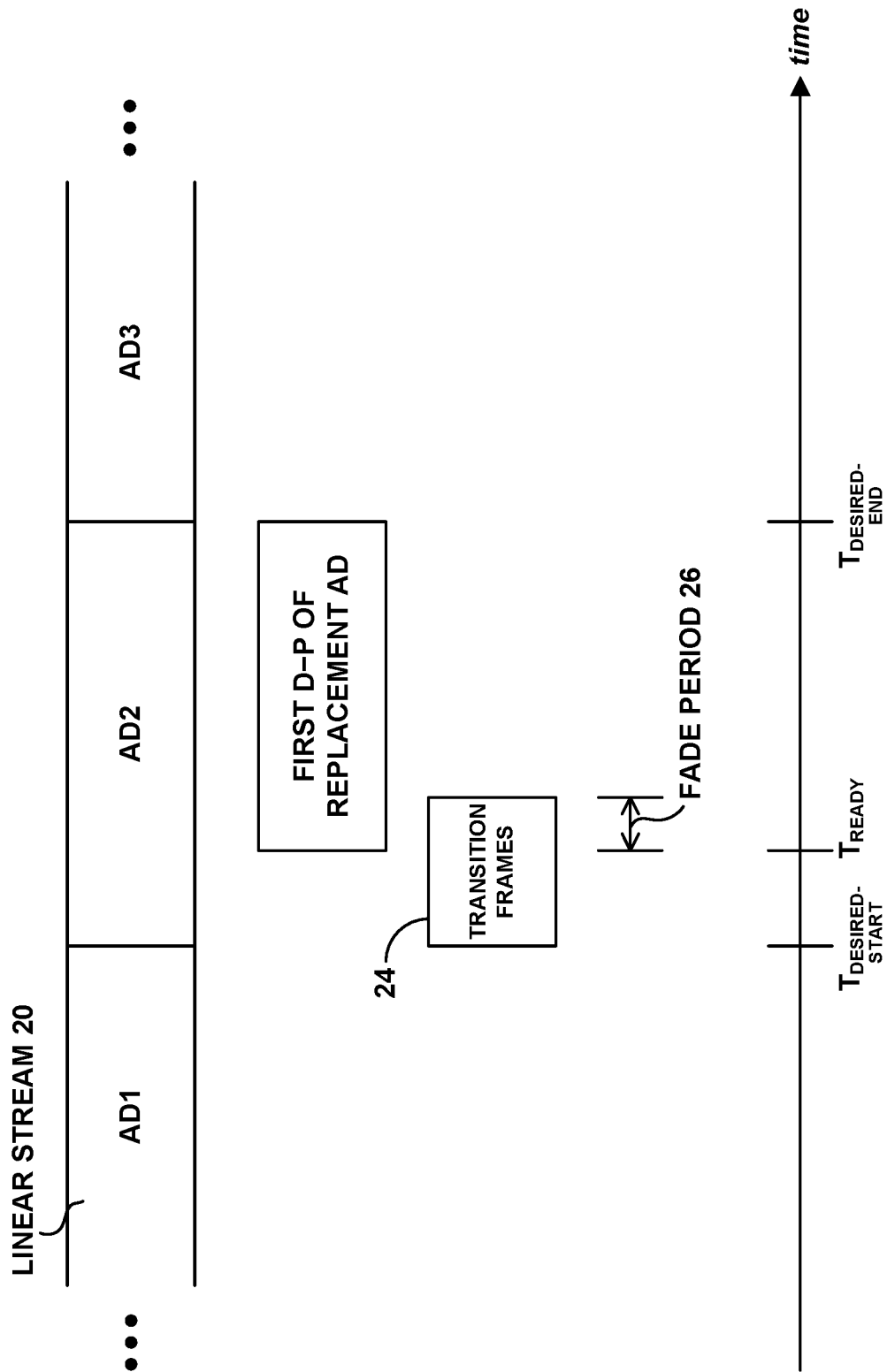
FIG. 6 is a diagram illustrating a result of the mechanism illustrated in FIG. 5.

FIG. 6 next illustrates an example result of this alternative process. As shown in FIG. 6, the client's playout of the first D-P seconds of the replacement ad will start at time $T_{READY}$ and will end at time $T_{DESIRED-END}$, so that the end of the client's playout of the replacement ad should optimally align with the end of AD2 in the underlying linear stream 20 as desired. (Here again, the client may similarly need to take action such as fading at or near the end of this replacement ad playout, to account for delay in switching back from playout of the replacement ad stream to playout of the linear stream.)

Figure 7:
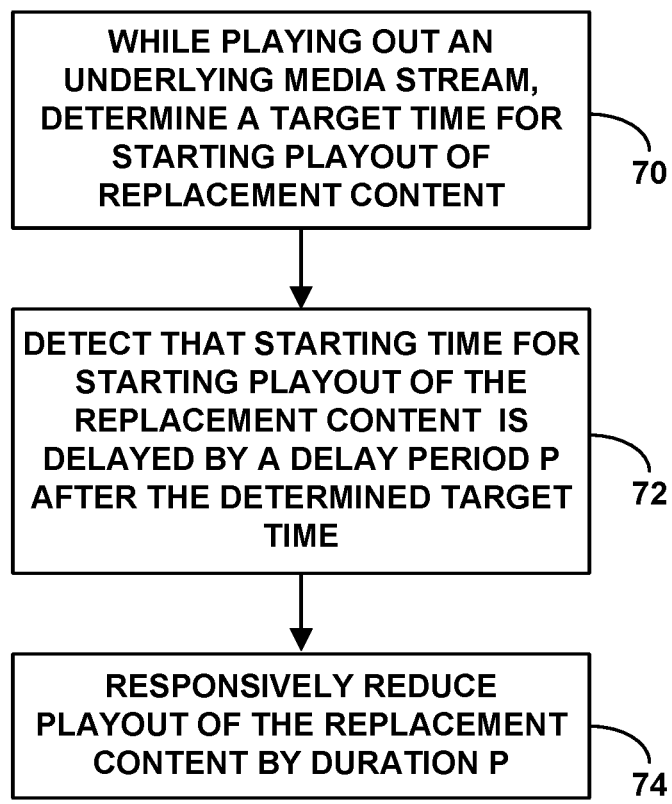
FIG. 7 is flow chart depicting a method that could be carried out in accordance with the disclosure.

FIG. 7 is next a flow chart depicting a method that can be carried out in accordance with this disclosure. This method could be carried out by a device such as a media client or other playback device, to facilitate playout of replacement content in place of a portion of an underlying media stream, where the replacement content and the portion of the underlying media stream are of equal duration D. As discussed above, in an example implementation, the portion of the underlying media stream could be an ad in an ad pod, and the replacement content could be a replacement ad. Alternatively, the content could take other forms.

As shown in FIG. 7, at block 70, while the device is playing out the underlying media stream, the device determines a target time at which to begin playout of the replacement content. For instance, the client could determine this target time by receiving a directive from a server or other entity specifying the target time and/or by itself evaluating to determine the target time.

At block 72, device then detects that the a starting time at which the device starts playout of the replacement content is after the determined target time by a delay period of duration P. For instance, the device could measure how much time has passed from the desired start time to the time when the device will start, is starting, or will start playout of the replacement content.

And at block 74, in response to detecting this delay, the device will then reduce its playout of the replacement content by duration P to help align an end of playout of the replacement content with an end of the portion of the underlying media stream. As discussed above, this reducing operation could involve seeking forward in the replacement content by duration P to a new time point in the replacement content, and starting playout of the replacement content at the new time point. Alternatively or additionally, the reducing could involve ending playout of the replacement content a duration of P early. Still alternatively or additionally, the reducing could involve removing one or more intervening frames from the replacement content, to help bring the total duration of playout of replacement content down to D-P.

As further discussed above, the device could additionally play out transition frames during the delay period P, in place of playout of an initial part of the portion of the underlying media stream. And the device could fade from playout of the transition frames to playout of the replacement content.

In addition, as discussed above, if the media at issue comprises video, then the transition frames could comprise black frames and/or frames that are a copy of a last played frame of the first media stream. And if the media at issue comprises audio, then the transition frames could comprise silent frames.

Figure 8:
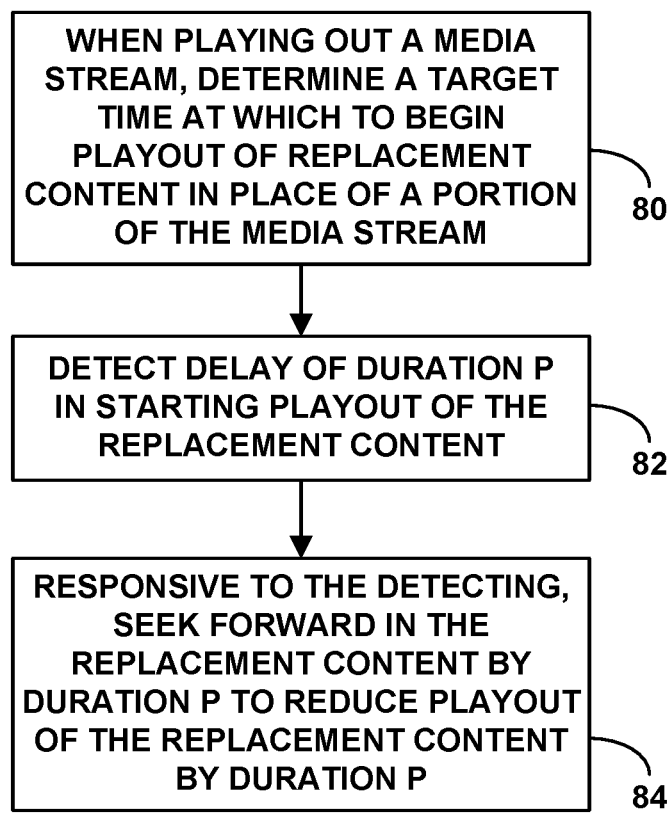
FIG. 8 is another flow chart depicting a method that could be carried out in accordance with the disclosure.

FIG. 8 is another flow chart depicting a method that can be carried out in accordance with this disclosure. As shown in FIG. 8, at block 80, when a device is playing out a media stream, the device determines a target time at which the device is to begin playout of replacement content in place of a portion of the media stream. At block 82, the device detects that a starting time at which the device starts playout of the replacement content is after the determined target time by a delay period of duration P. And at block 84, responsive to the detecting, the device seeks forward in the replacement content by duration P to reduce playout of the replacement content by duration P.

Various features described above can be applied in the context of this method and vice versa. For instance, the media stream could be an ad pod, and the replacement content could be a replacement ad. Further, the device could additionally play out transition frames (e.g., black frames, silent frames, or the like) during the delay period P and could add fading to smooth transitions.

Figure 9:
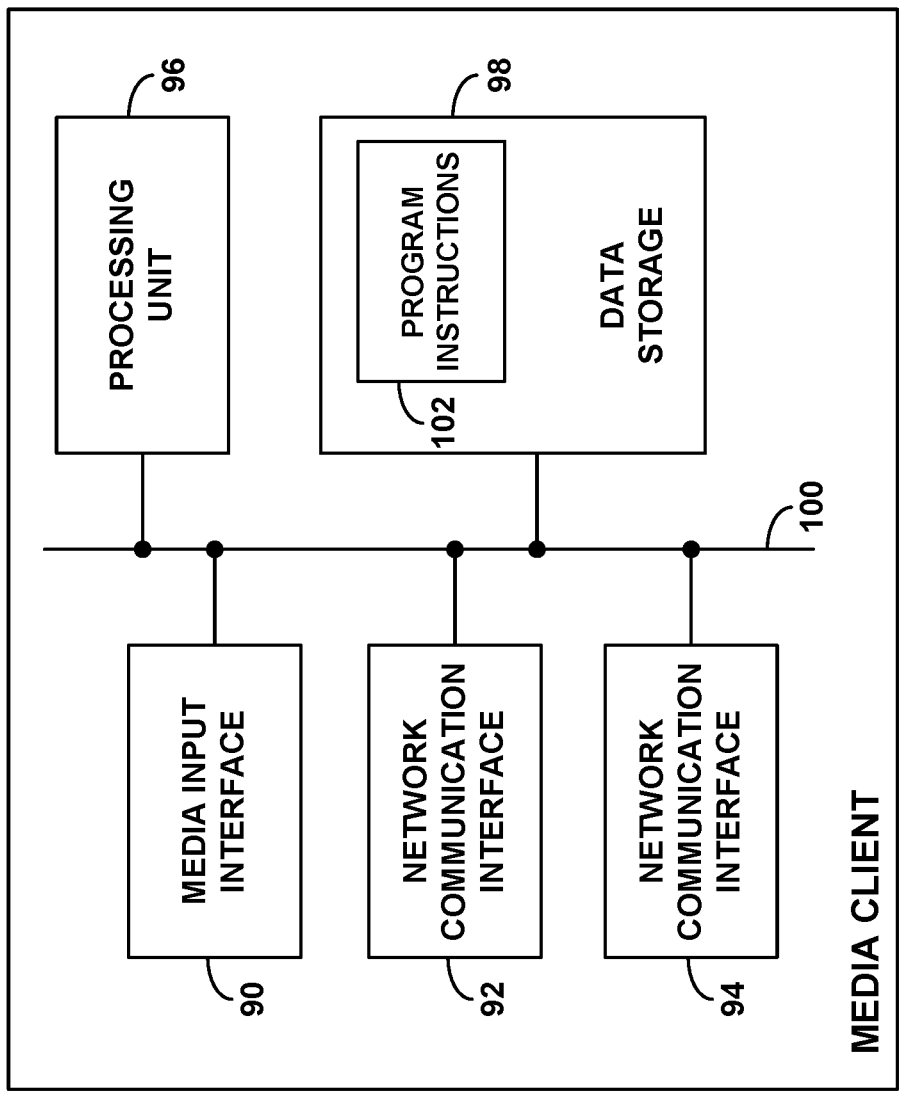
FIG. 9 is a simplified block diagram depicting components of an example media client that could operate in accordance with the disclosure.

Finally, FIG. 9 is a simplified block diagram of an example media client, showing some of the components that can be included in such a device to facilitate carrying out operations such as those noted above. In line with the discussion above, this client could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 9, the example client includes a media input interface 90, a network communication interface 92, a media presentation interface 94 a processing unit 96, and non-transitory data storage 98, any or all of which could be integrated together or, as shown, communicatively linked together by a system bus, network, or other connection mechanism 100.

The client could use media input interface 90 and/or network communication interface 92 to receive media streams for presentation. Either of these interfaces could include one or more wired and/or wireless interfaces for establishing communication with and receiving media content in analog or digital form from a receiver, server, or other device or system. For example, the media input interface could include one or more interfaces compliant with protocols such as DVI, HDMI, VGA, USB, BLUETOOTH, WIFI, among numerous others, and the network communication interface could comprise a wired or wireless Ethernet interface, for engaging in local or wide area packet-based communication so as to interact with one or more servers and/or other devices or systems.

Media presentation interface 94 could then comprise one or more components to facilitate presentation of media content. By way of example, the media presentation interface could comprise a user interface such as a display screen and/or a loudspeaker, as well as one or more drivers or other components for processing the received media content to facilitate presentation of the content on the user interface.

Processing unit 96 could comprise one or more general purpose processors (e.g., microprocessors) and/or one or more specialized processors (e.g., application specific integrated circuits). And non-transitory data storage 98 could comprise one or more volatile and/or non-volatile storage components, such as optical, magnetic, or flash storage.

Further, as shown, data storage 98 could store program instructions 102, which could be executable by processing unit 96 to cause the client to carry out various operations described herein. For instance, the operations could include, while the client is playing out an underlying media stream, determining a target time at which the client is to begin playout of replacement content in place of a portion of the underlying media stream. Further, the operations could include detecting that a starting time at which the client starts (e.g., has started, is starting, or will start) playout of the replacement content is after the determined target time by a delay period of duration P. And the operations could include, responsive to the detecting, reducing playout of the replacement content by duration P. Here too, various operations described above could be applied in this context and vice versa.

Exemplary embodiments have been described above. Those skilled in the art will understand, however, that changes and modifications may be made to these embodiments without departing from the true scope and spirit of the invention.

What is claimed is:

1. A method for a device to play out replacement content in place of a portion of an underlying media stream, wherein the replacement content and the portion of the underlying media stream are of equal duration D, the method comprising:

while the device is playing out the underlying media stream, determining by the device a target time at which to begin playout of the replacement content;

detecting by the device that a starting time at which the device starts playout of the replacement content is or will be after the determined target time by a delay period of duration P; and responsive to the detecting, reducing by the device playout of the replacement content to help align an end of playout of the replacement content with an end of the portion of the underlying media stream, wherein reducing playout of the replacement content includes (i) detecting in the replacement content one or more duplicate frames, (ii) responsive to detecting in the replacement content the one or more duplicate frames, skipping playout of the one or more duplicate frames when playing out the replacement content, (iii) detecting by the device that skipping playout of the one or more duplicate frames shortens the playout of the replacement content by less than the duration P, and (iv) responsive to the detecting that the removal of the duplicate frames shortens the playout of the replacement content by less than the delay period of duration P, truncating by the device playout of the replacement content such that the playout of the replacement content lasts a duration D-P to help align the end of playout of the replacement content with the end of the portion of the underlying media stream.

2. The method of claim 1, wherein the portion of the underlying media stream is an ad in an ad pod, and wherein the replacement content is a replacement ad.

3. The method of claim 1, further comprising playing out by the device transition frames during the delay period, in place of playout of an initial part of the portion of the underlying media stream.

4. The method of claim 3, further comprising fading by the device from playout of the transition frames to playout of the replacement content.

5. The method of claim 3, wherein the underlying media stream comprises video, and wherein the transition frames comprise black frames.

6. The method of claim 3, wherein the underlying media stream comprises audio, and wherein the transition frames comprise silent frames.

7. The method of claim 1, wherein the device is a television.

8. The method of claim 1, wherein the device is a set top box.

9. The method of claim 1, wherein the media stream comprises watermark data corresponding with an identity of the media stream, wherein the identity of the media stream is associated with the start time, wherein the method further comprises:

determining, by the device from the media stream, the watermark data; and based on the watermark data, determining by the device the identity of the media stream, wherein detecting that a starting time at which the media client starts playout of the replacement content is or will be after the determined target time by a delay period of duration P is based on the identity of the media stream.

10. The method of claim 1, further comprising:

buffering by the device for playout a plurality of upcoming frames of the replacement content, wherein detecting in the replacement content one or more duplicate frames comprises detecting the one or more duplicate frames in the plurality of buffered upcoming frames of the replacement content.

11. A media client comprising:

a processing unit;

non-transitory data storage; and program instructions stored in the non-transitory data storage and executable by the processing unit to cause the media client to carry out operations including:

while the media client is playing out an underlying media stream, determining a target time at which the media client is to begin playout of replacement content in place of a portion of the underlying media stream, detecting that a starting time at which the media client starts playout of the replacement content is or will be after the determined target time by a delay period of duration P, and responsive to the detecting, reducing playout of the replacement content to help align an end of playout of the replacement content with an end of the portion of the underlying media stream, wherein reducing playout of the replacement content includes (i) detecting in the replacement content one or more duplicate frames, (ii) responsive to detecting in the replacement content the one or more duplicate frames, skipping playout of the one or more duplicate frames when playing out the replacement content, (iii) detecting by the device that skipping playout of the one or more duplicate frames shortens the playout of the replacement content by less than the duration P, and (iv) responsive to the detecting that the removal of the duplicate frames shortens the playout of the replacement content by less than the delay period of duration P, truncating by the device playout of the replacement content such that the playout of the replacement content lasts a duration D-P to help align the end of playout of the replacement content with the end of the portion of the underlying media stream.

12. The media client of claim 11, wherein the portion of the underlying media stream is an ad in an ad pod, and wherein the replacement content is a replacement ad.

13. The media client of claim 11, wherein the operations further include playing out transition frames during the delay period, in place of playout of an initial part of the portion of the underlying media stream.

14. The media client of claim 13, wherein the operations further include fading by the device from playout of the transition frames to playout of the replacement content.

15. The media client of claim 13, wherein the underlying media stream comprises video, and wherein the transition frames comprise black frames.

16. The media client of claim 13, wherein the underlying media stream comprises audio, and wherein the transition frames comprise silent frames.

17. The media client of claim 11, wherein the media client is a television.

18. The media client of claim 11, wherein the media client is a set top box.

19. Non-transitory data storage storing program instructions executable by a processing unit to cause a media client to carry out operations including:

while the media client is playing out an underlying media stream, determining a target time at which the media client is to begin playout of replacement content in place of a portion of the underlying media stream;

detecting that a starting time at which the media client starts playout of the replacement content is or will be after the determined target time by a delay period of duration P; and responsive to the detecting, reducing playout of the replacement content to help align an end of playout of the replacement content with an end of the portion of the underlying media stream, wherein reducing playout of the replacement content includes (i) detecting in the replacement content one or more duplicate frames, (ii) responsive to detecting in the replacement content the one or more duplicate frames, skipping playout of the one or more duplicate frames when playing out the replacement content, (iii) detecting by the device that skipping playout of the one or more duplicate frames shortens the playout of the replacement content by less than the duration P, and (iv) responsive to the detecting that the removal of the duplicate frames shortens the playout of the replacement content by less than the delay period of duration P, truncating by the device playout of the replacement content such that the playout of the replacement content lasts a duration D-P to help align the end of playout of the replacement content with the end of the portion of the underlying media stream.

20. The non-transitory data storage of claim 19, wherein the portion of the underlying media stream is an ad in an ad pod, and wherein the replacement content is a replacement ad.

* * * * *